(12) United States Patent
Liu et al.

(10) Patent No.: US 9,831,984 B1
(45) Date of Patent: Nov. 28, 2017

(54) METHOD AND DEVICE FOR ERROR DECISION

(71) Applicant: Beken Corporation, Shanghai (CN)

(72) Inventors: Lianxue Liu, Shanghai (CN); Donghui Gao, Shanghai (CN); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/164,892

(22) Filed: May 26, 2016

(30) Foreign Application Priority Data

May 12, 2016 (CN) .......................... 2016 1 0316472

(51) Int. Cl.
*H03M 13/00* (2006.01)
*H04L 1/00* (2006.01)
*H04W 4/00* (2009.01)

(52) U.S. Cl.
CPC .......... *H04L 1/0045* (2013.01); *H04L 1/0061* (2013.01); *H04W 4/008* (2013.01)

(58) Field of Classification Search
CPC . H04N 21/236; H04L 27/2627; H04L 1/0057; H04L 27/2647; H04L 27/2655; H04L 27/36; G06F 11/1076; H03M 13/1102; H03M 13/1165; H03M 13/255; H03M 13/618; H03M 13/2778; H03M 13/27; H03M 13/09; H03M 13/2792; H03M 13/036; H03M 13/616; H03M 13/10
See application file for complete search history.

(56) References Cited

PUBLICATIONS

Wikipedia; Adder (electronics); https://en.wikipedia.org/w/index.php?title=Adder_(electronics)&oldid=702882951; Feb. 2, 2016.
Lynch, Jamel Pleasant; Co-Channel Interference in Bluetooth Piconets; Chapter 2: Bluetooth Transmission Technology; p. 6-21; http://hdl.handle.net/10919/35741; Jun. 10, 2002.

*Primary Examiner* — Guerrier Merant
(74) *Attorney, Agent, or Firm* — Perkins Coie LLP (57) ABSTRACT

A method of error decision, comprising: for each of a plurality of demodulated decision information in a codeword, identifying by a controller, a decoded bit for the demodulated decision as an erasable error bit if the demodulated decision information is larger than a first threshold and smaller than a second threshold; for all the identified erasable error bits, enumerating by a calculator, all possible combinations of the identified erasable error bits; for each combination of all enumerated possible combinations feeding by the calculator, each combination with all other decided decoded bits of the code word into a header correction checker; performing, by the header correction checker, header correction checking for each combination; and outputting, by a decision circuit connected to the header correction checker, a combination with a correct header correction check (HEC) result as an output sequence.

8 Claims, 12 Drawing Sheets

FIG. 9

METHOD AND DEVICE FOR ERROR DECISION

CLAIM OF PRIORITY

This application claims priority to Chinese Application number 201610316472.7 entitled "Method and Device for Error Decision", filed on May 12, 2016 by Beken Corporation, which is incorporated herein by reference.

TECHNICAL FIELD

The present application relates to error decision and more particularly, but not exclusively, to error decision.

BACKGROUND OF THE INVENTION

A baseband section in the Bluetooth standard describes in detail the structure of a Packet Header, HEC (Header Error Check) and 1/3 FEC (1/3 Forward Error Correction Coding) method. Packet Header carries Link Control information. Such information cannot be parsed if a HEC error is detected by a decoding side, therefore the entire packet will be lost, which will seriously affect the communication performance and efficiency. Therefore, at a given signal to noise (SNR) ratio condition, a good error correction method is especially important.

1/3 FEC algorithm for Packet Header design usually achieves error correction by Majority Decision Decoding, and achieves error detection by HEC. However, such methods do not take full advantage of the redundant information of HEC.

Accordingly, a new device and method that overcome these issues are desirable.

BRIEF DESCRIPTION OF THE INVENTION

Embodiments of the invention take full advantage of redundant information in HEC, so as to realize concatenated decoding which uses both inner code and outer coder. Note an information transmission process includes signal source encoding, channel encoding and demodulator. A part of channel encoding which is close to the signal source is called inner code, and a part of channel encoding which is close to the demodulator is called outer code. In the embodiments discussed below, HEC is called inner code, as it is near the signal source, and the 1/3FEC is called outer code, as it is near the demodulator.

According to the embodiment of the invention, a method of error decision, comprises for each of a plurality of demodulated decision information in a code word (or also called code), wherein the plurality of demodulated decisions includes a decision for cyclic redundancy correction bits—identifying, by a controller, a decoded bit for the demodulated decision as an erasable error bit if the demodulated decision information is larger than a first threshold and smaller than a second threshold; for all the identified erasable error bits—enumerating, by a calculator, all possible combinations of the identified erasable error bits; for each combination of all enumerated possible combinations—feeding, by the calculator, each combination with all other decided decoded bits of the code word into a header correction checker, herein all the other decided decoded bits are not identified as erasable error bits; and outputting, by the header correction checker, a combination with a correct header correction check (HEC) result as an output sequence.

According to another embodiment of the invention, a circuit of error decision comprises for each of a plurality of demodulated decision information for a code word, wherein the plurality of demodulated decision includes a decision for cyclic redundancy correction bits—a controller configured to identify, a decoded bit for the demodulated decision as an erasable error bit if the demodulated decision information is larger than a first threshold and smaller than a second threshold; for all the identified erasable error bits—a calculator configured to enumerate all possible combinations of the identified erasable error bits; for each combination of all enumerated possible combinations—the calculator is further configured to feed each combination with all other decided decoded bits of the code word into a header correction checker, wherein all the other decided decoded bits are not identified as erasable error bits; and the header correction checker is further configured to output a combination with a correct header correction check (HEC) result as an output sequence.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the invention. Certain terms may even be emphasized below; however, any terminology intended to be interpreted in any restricted manner will be overtly and specifically defined as such in this Detailed Description section.

Figure 1:
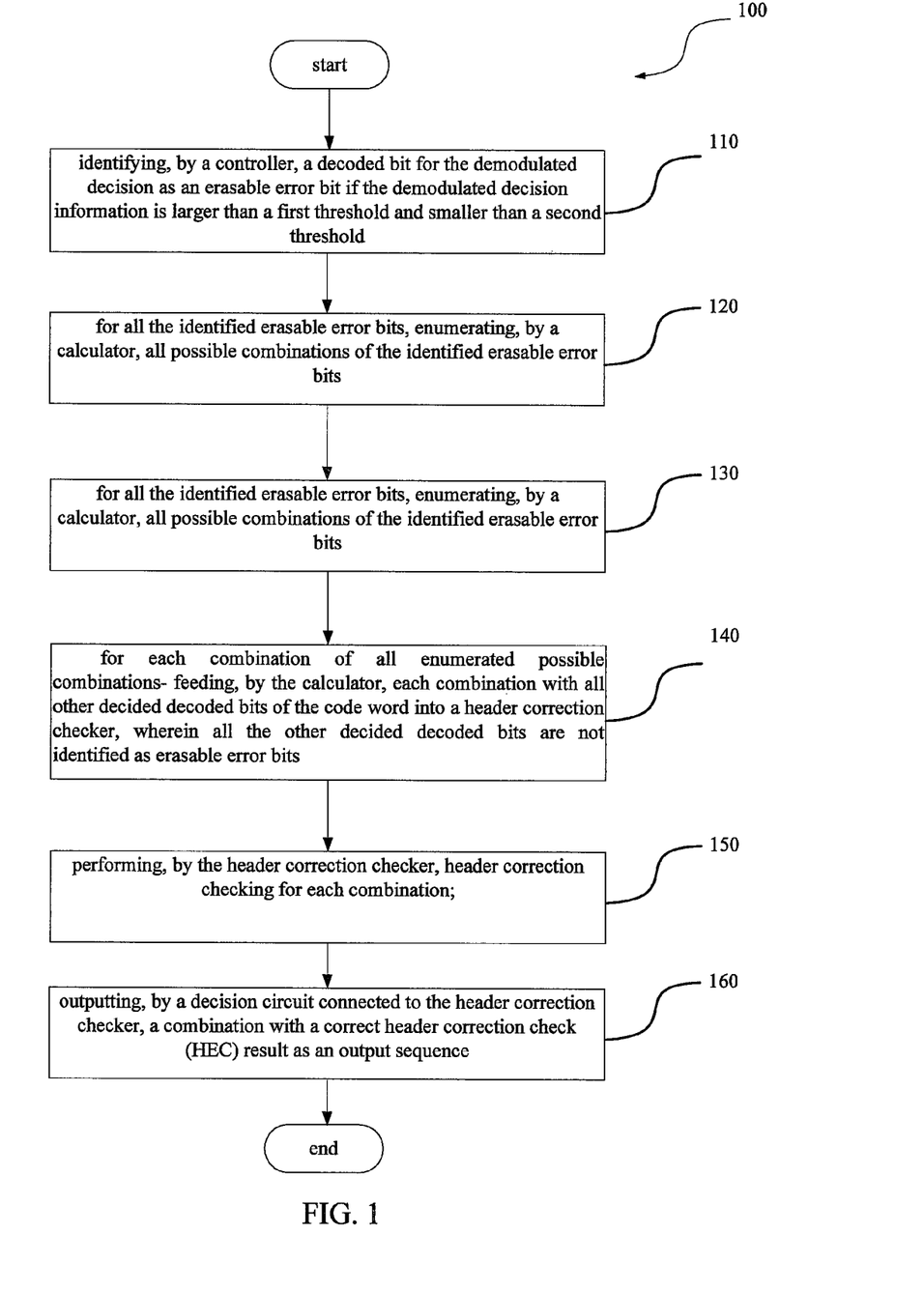
FIG. 1 is a flowchart of a method for error detection and correction according to an embodiment of the invention.

FIG. 1 is a flowchart of a method for error detection and correction according to an embodiment of the invention. The method 100 of error decision comprises, for each of a plurality of demodulated decision information in a code word, wherein the plurality of demodulated decisions include a decision for cyclic redundancy correction bits—identifying, in block 110, by a controller, a decoded bit for the demodulated decision as an erasable error bit if the demodulated decision information is larger than a first threshold and smaller than a second threshold, wherein the first threshold may have a value of 0, and the second threshold may have a value of 3; for all the identified erasable error bits—enumerating, in block 120, by a calculator, all possible combinations of the identified erasable error bits; for all the identified erasable error bits, enumerating, in block 130, by a calculator, all possible combinations of the identified erasable error bits; for each combination of all enumerated possible combinations—feeding, in block 140, by the calculator, each combination with all other decided decoded bits of the code word into a header correction checker, wherein all the other decided decoded bits are not identified as erasable error bits; performing, in block 150 by the header correction checker, header correction checking for each combination; and outputting, in block 160, by a decision circuit connected to the header correction checker, a combination with a correct header correction check (HEC) result as an output sequence.

Figure 2:
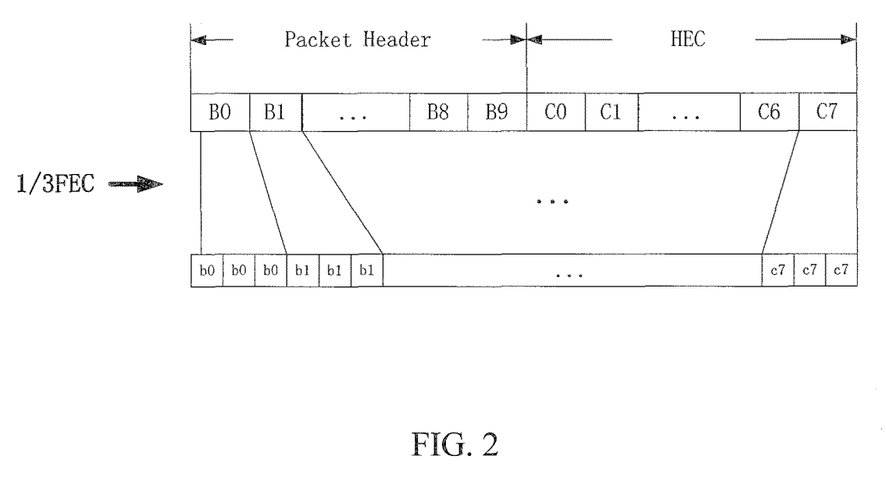
FIG. 2 is a diagram illustrating a packet header encoding scheme according to 1/3 FEC method.

FIG. 2 is a diagram illustrating a packet header encoding scheme according to 1/3 FEC encoding method. Note a 1/3FEC encoding method uses a repetition code that repeats the bit three times. As shown in FIG. 2, the original information bit b0 is repeated three times, and a subcode B0 is an added result of b0, which may takes a value of 0, 1, 2, or 3. Further, the correction bit c0 is repeated three times, and a subcode C0 is an added result of c0 repeated three times. Other subcodes are obtained by similar calculations. As a result, a code word comprises B0, B1, B2 ... B9 and C0, C1, ... C7, which include 18 subcodes. Note B0, B1, B2 ... B9 and C0, C1, ... C7 each represents a 1-bit value on the transmitter side, and x0, x1, x2 ... x17, discussed in further details below, each represents a 1-bit value received at the receiver, which may include errors due to the channel effect. Subcodes will be discussed in further detail with respect to FIGS. 3 and 4.

Figure 3:
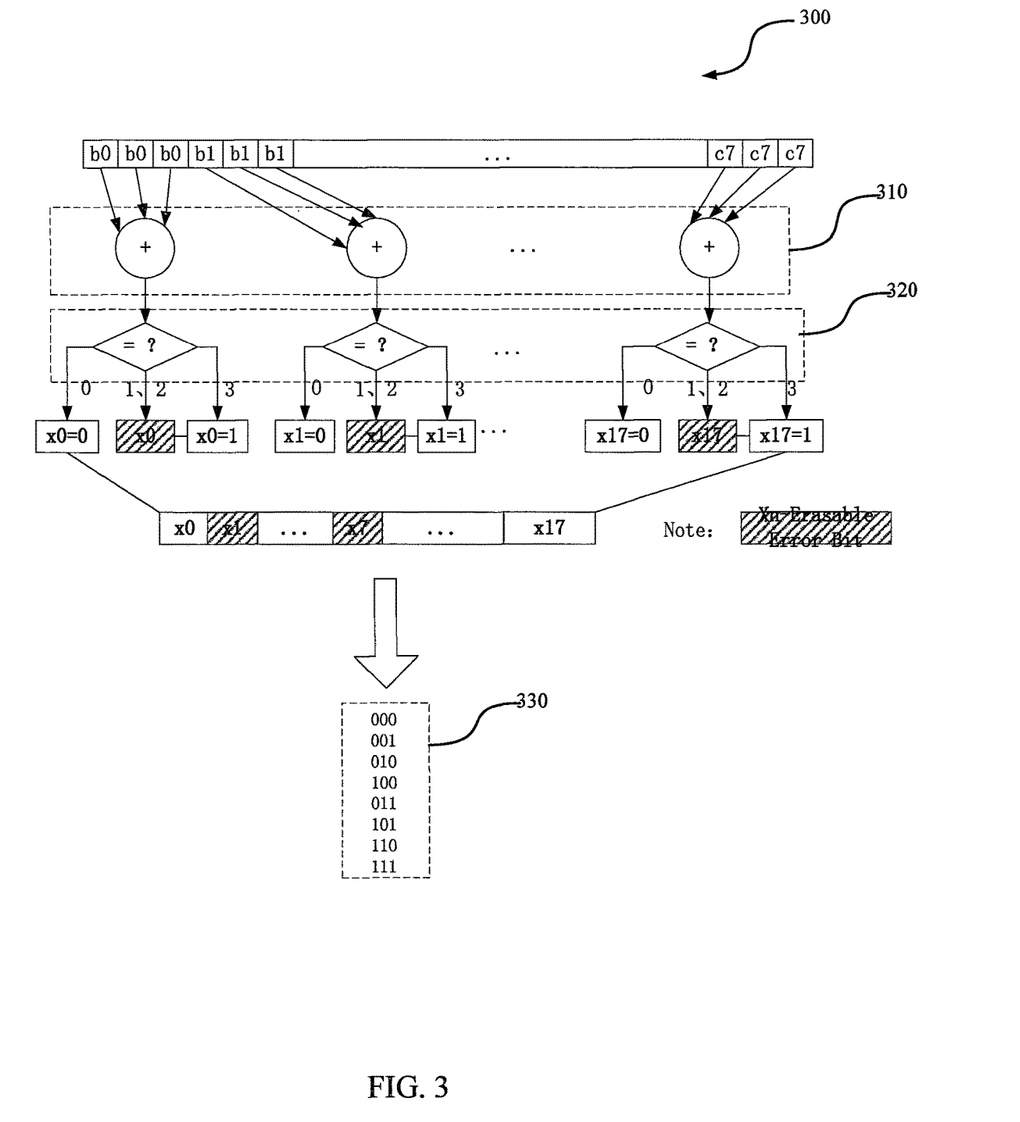
FIG. 3 is a flowchart of a method for error detection according to an embodiment of the invention.

FIG. 3 is a flowchart of a method 300 for decoding according to an embodiment of the invention. As shown in FIG. 3, the code word comprises 18 demodulated decision information, x0, x1, x2 ... x17, wherein x0, x1 ... x9 belong to information data, and x10, x11, ... x17 belong to correction data. Further, x0, x1, ... x9 are respective determination result of B0, B1, ... B9 shown in FIG. 2. x10, x11, ... x17 are respectively determination result of C0, C1, ... C9 shown in FIG. 2. x0, x1, x2 ... x17 can be represented as xn, where n has the value of any of 0 to 17. Here, each of B0, B1, ... B9, C0, C1 ... C9 has 1 bits. Each of xn has 1 bit.

To be specific, the plurality of code words xn', which each represents demodulated decision information, is obtained in block 310 by adding a predetermined number of adjacent bits within the code word, wherein the predetermined number equals three. For example, the adjacent bits b0, b0 and b0 are added to generate a demodulated information x0', and the adjacent bits c7, c7 and c7 are added to generated x10'. Alternatively, the adjacent bits b0, b0, and b0, or c7, c7 and c7 may be decoded by logic gates operations. Here b0b0b0, which is encoded from B0, has 3 bits.

Then, in block 320, the controller identifies a decoded bit for the demodulated decision as an erasable error bit, if the demodulated decision information is larger than 0, and smaller than 3. Note the value of xn' (for example, x0', or x10') may be from a group of {0, 1, 2, 3}. The controller identifies a decoded bit for the demodulated decision information as 0 if the demodulated decision result equals the first threshold. For example, when xn' equals 0, it can be deduced that the decoded bit xn for the demodulated decision xn' is determined as 0, since 0+0+0=0. The controller identifies a decoded bit for the demodulated decision information as 1 if the demodulated decision result equals the second threshold. For example, when xn' equals 3, it can be deduced that the decoded bit xn for the demodulated decision xn' is determined as 1, since 1+1+1=3. However, when xn' equals 1 or 2, it can be deduced that there should be some error in encoding or decoding, as a result, when xn' equals 1 or 2, the decoded bit xn for the demodulated decision xn' is determined as an erasable error bit. In other words, if xn' is smaller than 3 and larger than 0, the decoded bit xn for the demodulated decision xn' is determined as an erasable error bit. Here 0 corresponds to the first threshold, and 3 corresponds to the second threshold. Note the threshold value may vary if other data correction scheme is used other than 1/3 FEC.

Figure 4:
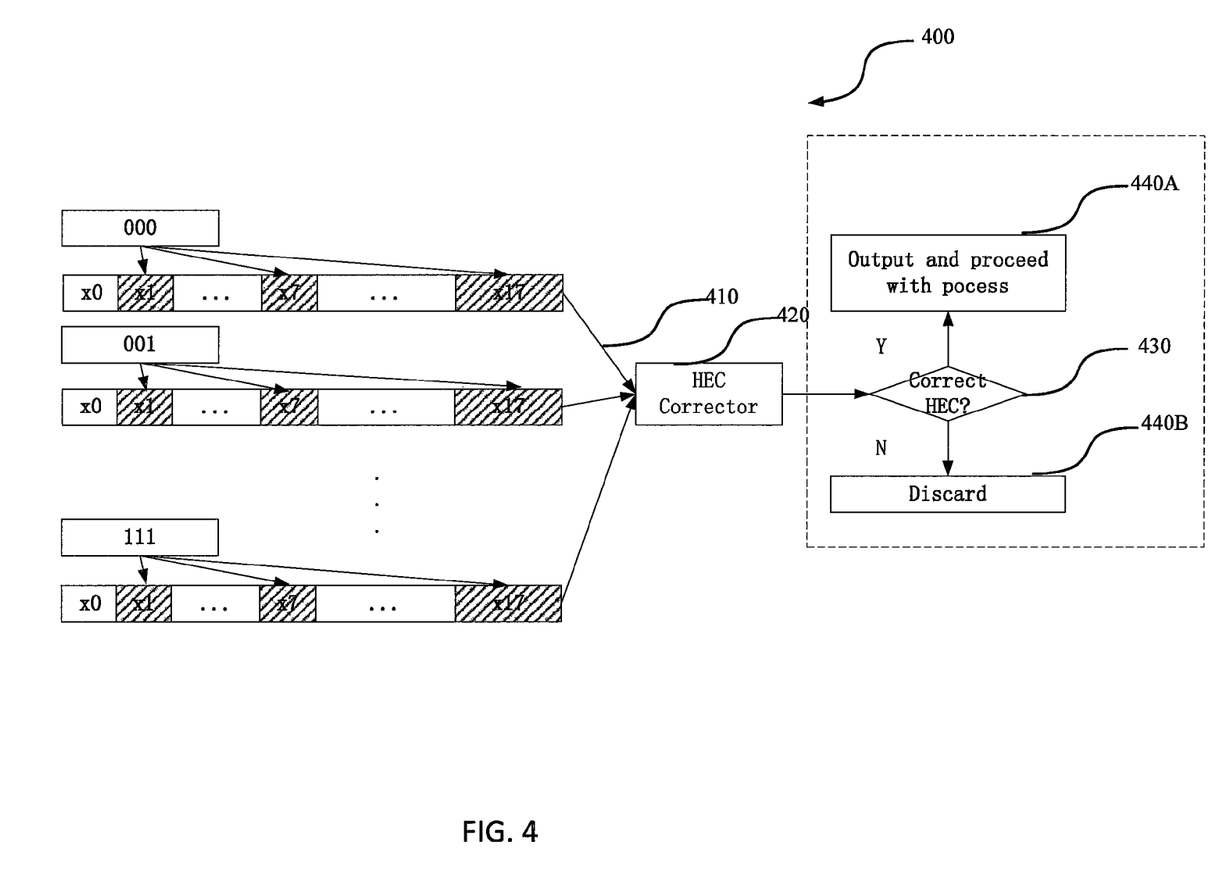
FIG. 4 is a flowchart of a method for decoding according to an embodiment of the invention.

Then, in block 330, for all the identified erasable error bits, for example, x1, x7 and x17 (which are marked as slash shadows) shown in FIG. 3, the method 300 comprises enumerating, by a calculator, all possible combinations of the identified erasable error bits, including 8 combinations, 000, 001, 010 ... 111 for x1, x7 and x17 shown in FIG. 3 and FIG. 4.

FIG. 4 is a flowchart of a method 400 for decoding according to an embodiment of the invention. As shown in FIG. 4, the method 400 comprises feeding, in block 410, by the calculator, each combination {0,0,0}, {0,0,1}, {0,1,0} ... {1,1,1} for the erasable error bits x1, x7 and x17 together with all other decided decoded bits (whose) of the subcode into a header correction checker, wherein all the other decided decoded bits are not identified as erasable error bits. In other words, as shown in FIG. 4, the other decided decoded bits include 15 bits, namely, x0, x2-x6, x8-x17. These 15 bits are decided as correctly decoded bits.

The method 400 further comprises performing, in block 420, header correction check on each group of output 18 bits. For example, the first group includes the combination of x1, x7 and x17 as 000, and the other correctly decoded bits, and the second group includes the combination of x1, x7 and x17 as 001, and the other correctly decoded bits. The rest groups can be done in the same manner.

The method 400 further comprises determining, in block 430, whether the HEC result is correct. If the HEC result is correct, the method 400 further comprises outputting, in block 440A, by the header correction checker (HEC corrector), a combination with a correct header correction check (HEC) result as an output sequence. If the HEC result is incorrect, the method 400 further comprises discarding, in block 440B, the HEC result.

Referring back to FIG. 3, which only shows that three bits are determined as erasable error bits. Alternatively, in an embodiment, there may be more than three decoded bits xn that have a corresponding demodulated decision xn' with a value of 1 or 2. Therefore, the controller may specify the first three bits which have a demodulated decision xn' of 1 or 2 as erasable error bits, and determine all the other bits as correctly decoded bits. Alternatively, the controller may specify the last three bits which have a demodulated decision xn' of 1 or 2 as erasable error bits, and determine all the other bits as correctly decoded bits. Alternatively, the method 300 may specify less or more than three bits as erasable error bits, so as to improve efficiency or accuracy.

Referring back to FIG. 1, alternatively, the method 100 comprises stopping feeding each combination with all the other decided decoded bits of the code word into a header correction checker once the combination with the correct header correction check result is obtained.

As shown in FIG. 3 and FIG. 4 above, the demodulated decision information comprises demodulated hard decision information. In other words, xn is a binary value.

Alternatively, the demodulated decision information comprises demodulated soft decision information.

For example, xn may be a 4-bit soft information, instead of a 1-bit hard information shown in FIG. 3 and FIG. 4. The 4-bit xn uses quantitative value to represent the possibility that whether the original bit is 0 or 1.

For example, the following table 1 illustrates a 4-bit soft information xn:

TABLE 1

| Decimal representation of the 4-bit soft information | Binary 4-bit soft information | Physical meaning |
| --- | --- | --- |
| 0 | '0000' | The maximum probability information is 0 |
| 1 | '0001' | Large probability information is 0, with minimum probability that the information is 1 |
| 2 | '0010' | Large probability information is 0, with small probability that the information is 1 |
| 3 | '0011' | Large probability information is 0, with small probability that the information is 1 |
| ... | ... | ... |
| 7 | '0111' | The probabilities that the information is 0 or the information is 0 are approximate |
| 8 | '1000' | The probabilities that the information is 0 or the information is 0 are approximate |
| ... | ... | |
| 14 | '1110' | Large probability information is 1, with minimum probability that the information is 0 |
| 15 | '1111' | The maximum probability information is 1 |

For a subcode with 3 symbols, each symbol may be of any of 16 values, ranging from [0,15] as listed above. Therefore the addition of the three symbols within the subcode may range from [0, 45]. Therefore, according to another embodiment of the invention, the first threshold may take the value of 15, and the second threshold may take the value of 30. For example, if the addition of three symbols is less than 15, then it is determined that the decoded value is 0, whereas when the addition of three symbols is larger than 30, then it is determined that the decoded value is 1. Alternatively, when the value is between [15, 30], the symbol is determined as erasable error bit. The following procedures are similar to the procedures discussed above with respect to FIG. 3 and FIG. 4, therefore the detailed description is omitted.

Figure 5:
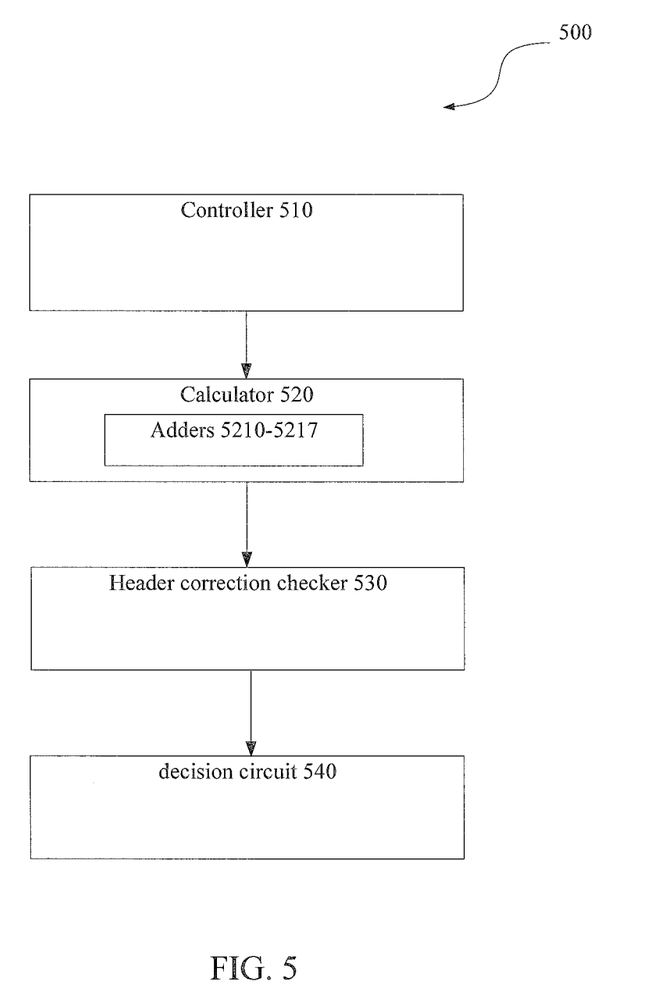
FIG. 5 is a block diagram of a circuit for error detection and correction according to an embodiment of the invention.

FIG. 5 is a block diagram of a circuit for error detection and correction according to an embodiment of the invention.

The circuit 500 comprises a controller 510, a calculator 520, a header correction checker 530 and a decision circuit 540. For each of a plurality of demodulated decision information for a code word, wherein the plurality of demodulated decision includes a decision for cyclic redundancy correction bits, the controller 510 is configured to identify, a decoded bit for the demodulated decision as an erasable error bit if the demodulated decision information is larger than a first threshold and smaller than a second threshold. For all the identified erasable error bits, the calculator 520 is configured to enumerate all possible combinations of the identified erasable error bits. For each combination of all enumerated possible combinations, the calculator 520 is connected to the controller 510, and is further configured to feed each combination with all other decided decoded bits of the code word into the header correction checker 530. Wherein all the other decided decoded bits are not identified as erasable error bits; and the header correction checker 530 is connected to the calculator 520, and is further configured to perform header correction checking for each combination. The decision circuit 540 is connected to the header correction checker 530. The decision circuit 540 outputs a combination with a correct header correction check (HEC) result as an output sequence.

Alternatively, before the controller 510 identifies the decoded bit as the erasable error, the controller 510 is further configured to decide whether a demodulated decision information is larger than a first threshold and smaller than a second threshold. The controller 510 identifies a decoded bit for the demodulated decision information as 0 if the demodulated decision result equals the first threshold. The controller 510 alternatively identifies a decoded bit for the demodulated decision information as 1 if the demodulated decision result equals the second threshold.

Alternatively, the calculator 520 is further configured to stop feeding each combination with all the other decided decoded bits of the code word into a header correction checker once the combination with the correct header correction check result is obtained. Further, although FIG. 5 only shows one decision circuit 540, the actual circuit 500 may comprise multiple decision circuits 540. For example, the actual circuit 500 may include 8 decision circuits 540.

Alternatively, the calculator 520 further comprises adders 5210-5217, configured to obtain the demodulated decision information by adding a predetermined number of adjacent bits within the code word, wherein the predetermined number equals three.

Alternatively, the demodulated decision information comprises demodulated hard decision information.

Alternatively, the demodulated decision information comprises demodulated soft decision information.

Figure 6:
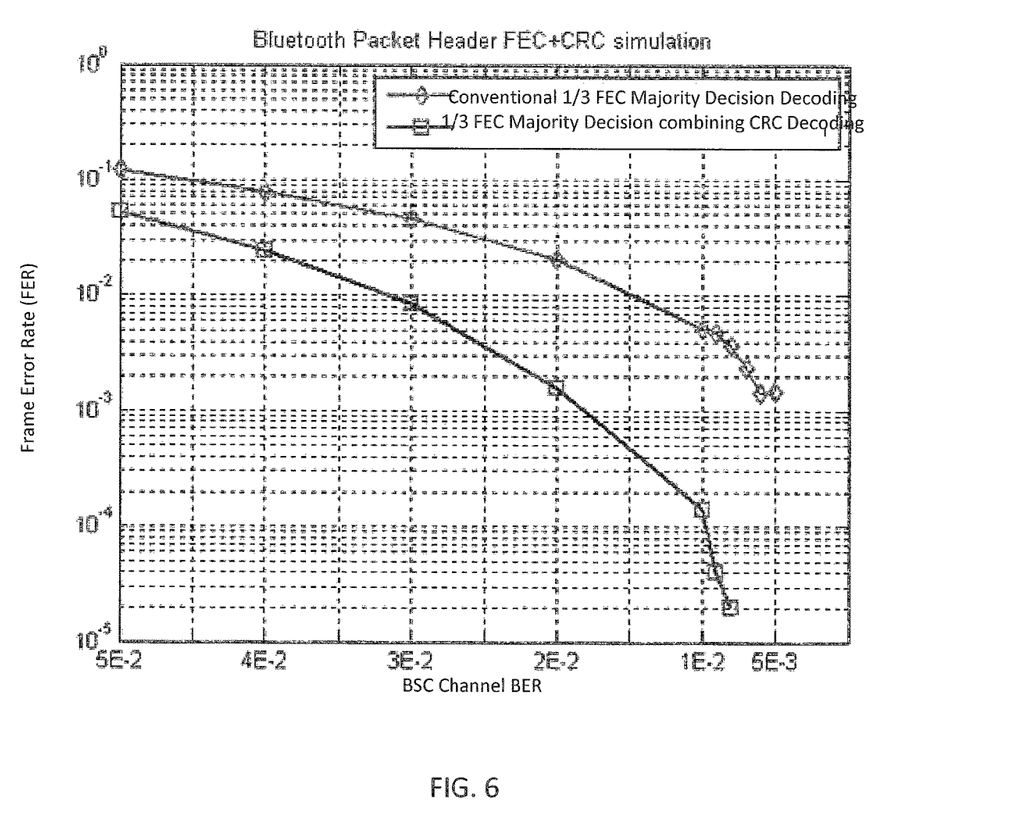
FIG. 6 is a simulation diagram illustrating performance comparison between a conventional device and device that uses a method according to an embodiment of the invention.

FIG. 6 is a simulation diagram illustrating a performance comparison between the conventional device and a device that uses a method according to an embodiment of the invention. The diamond shape legend represents the conventional 1/3 FEC Majority Decision decoding, while the square shape legend represents the 1/3 FEC Majority Decision combining CRC Decoding according to embodiments of the invention. According to FIG. 6, for Binary Symmetric Channel (BSC), for a same bit error rate (BER), for example, $4 \times 10^{-2}$, the frame error rate (FER) has been reduced from $7 \times 10^{-2}$ to $2 \times 10^{-2}$. In another example, for a same bit error rate (BER), for example, $1 \times 10^{-2}$, the frame error rate (FER)

has been reduced from $5 \times 10^{-3}$ to $1.5 \times 10^{-4}$. For example, in a case for $1.5 \times 10^{-4}$, x=1, y=5, x.y=1.5, and n=4, wherein x.y represent a logarithm value for frame error rate shown on Y axis.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The controller 510, the calculator 520, the header correction checker 530, and the decision circuit 540 may be implemented by logic, such as the combination of AND, OR, NOT gates, etc.

Figure 7:
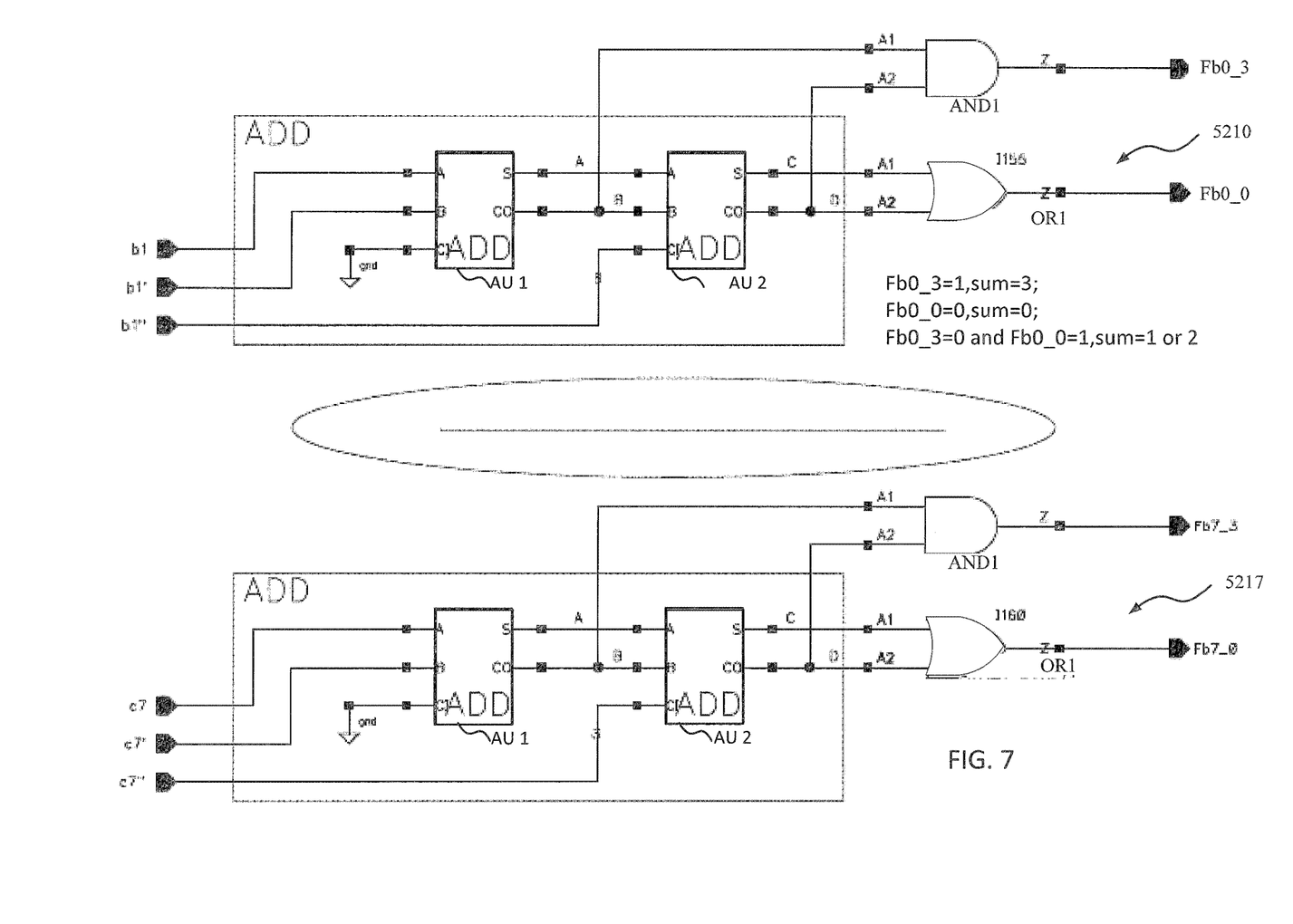
FIG. 7 is a circuit diagram for adders according to an embodiment of the invention.

FIG. 7 is a circuit diagram for adders 5210-5217 shown in FIG. 5 according to an embodiment of the invention. In FIG. 7, two adders of 5210 and 5217 of eight sets of adders 5210, 5211, 5212, . . . 5217 are shown. The adder 5210 with the output feedbacks Fb0_0 and Fb0_3 is taken as an example for description. The adder 5210 comprises a first adding unit AU1, a second adding unit AU2, an AND gate AND1 and a first OR gate OR1. Note each adding unit AU1, AU2 is a full adder that adds binary numbers and accounts for values carried in as well as out. A one-bit full adder adds three one-bit numbers, which are written as A, B, and $C_{in}$ (which is shown as $C_I$ in FIG. 7); A and B are the operands, and $C_{in}$ is a bit carried in from the previous less significant stage. The circuit produces a two-bit output, output carry and sum typically represented by the signals $C_{out}$ (which is shown as $C_O$ in FIG. 7) and S, where sum=$2 \times C_{out}$+S.

As shown in FIG. 7, a first input port A and a second input port B of the first adding unit AU1 are respectively configured to receive first and second bits of the adjacent bits, for example, b0 and b0'. A sum port of the first adding unit AU1 is connected to a first input port A of the second adding unit AU2. A Cin port of the first adding unit AU1 is connected to ground gnd.

A second input port B of the second adding unit AU2 is connected to a Cout port of the first adding unit AU1, a Cin port of the second adding unit AU2 is connected to a third bit b0" of the adjacent bits, and a Cout port of the second adding unit AU2 is connected to a second input port A2 of the first OR gate OR1.

A first input port A1 of the first OR gate OR1 is connected to the Cout port of the first adding unit AU1, wherein an output port Z of the first OR gate OR1 is configured to output a first value of the demodulated decision information Fb0_0, Fb0_3 . . . Fb7_0, Fb7_3.

A Cout port Co of the first adding unit AU1 is connected to a first input port A1 of the first AND gate AND1. A Cout port Co of the second adding unit AU2 is connected to a second input port A2 of the first AND gate AND1, and an output port Z of the first AND gate AND1 is configured to output a second value of the demodulated decision information.

When Fb0_3=1, it means the sum equals 3, and the demodulated decision can be successfully decoded as 1.

When Fb0_0=0, it means the sum equals 0, and demodulated decision can be successfully decoded as 0.

When Fb0_3=0 and Fb0_0=1, it means the sum equals 1 or 2, then a decoded bit for the demodulated decision is determined as an erasable error.

Note the logic relationship among b0b0'b0", Fb0_3 and Fb0_0 are shown below in the Table 2

TABLE 2

| b0b0'b0" | Fb0_3 | Fb0_0 |
|---|---|---|
| 0 0 0 | 0 | 0 |
| 1 0 0 | 0 | 1 |
| 0 1 0 | 0 | 1 |
| 0 0 1 | 0 | 1 |
| 1 1 0 | 0 | 1 |
| 1 0 1 | 0 | 1 |
| 0 1 1 | 0 | 1 |
| 1 1 1 | 1 | 1 |

As each of other adders 5211, 5212, 5213 . . . 5217 comprises similar elements as the adder 5210, their detailed description is omitted.

FIGS. 8A-8D are respective circuit diagrams for consecutive parts of header error corrector 530 shown in FIG. 5 according to an embodiment of the invention. In other words, the header error corrector is split into 4 parts, each shown in FIGS. 8A-8D.

The partial views of header correction checker 530 are respectively shown in FIGS. 8A, 8B, 8C and 8D as 530A, 530B, 530C, and 530D. The header correction checker 530 comprises a first D-type Flip Flop (DFF1), a second DFF (DFF2), a third DFF (DFF3), a fourth DFF (DFF4), a fifth DFF (DFF5), a sixth DFF (DFF6), a seventh DFF (DFF7), and an eighth DFF (DFF8), a first XOR gate XOR1, a second XOR gate XOR2, a third XOR gate XOR3, a fourth XOR gate XOR4, and a fifth XOR gate XOR5.

A clock port clk of each of DFF1, DFF2, DFF3, DFF4, DFF5, DFF6, DFF7 and DFF8 is configured to receive a clock signal clk. A negative reset port RN of each of DFF1, DFF2, DFF3, DFF4, DFF5, DFF6, DFF7 and DFF8 is configured to receive a negative reset signal rstb. A first input port A1 of the XOR gates XOR1, XOR2, XOR3, XOR4 is connected to a D port of the first DFF. A Q port of each of DFF1, DFF2, DFF3, DFF4, DFF5, DFF6, DFF7 and DFF8 is further configured to outputs a nth digit , of an output signal, for example, D<1>, D<2>, D<3>, D<4>, D<5>, D<6>, D<7> and D<8> respectively. D<1>, D<2>, D<3>, D<4>, D<5>, D<6>, D<7> and D<8> each represents a remainder of the division for the NEC check in the DFF. For example, when all of D<1>, D<2>, D<3>, D<4>, D<5>, D<6>, D<7> and D<8> equal zero, it indicates that the HEC is correct. Otherwise, there may be errors in the decoded bits.

Figure 8A:
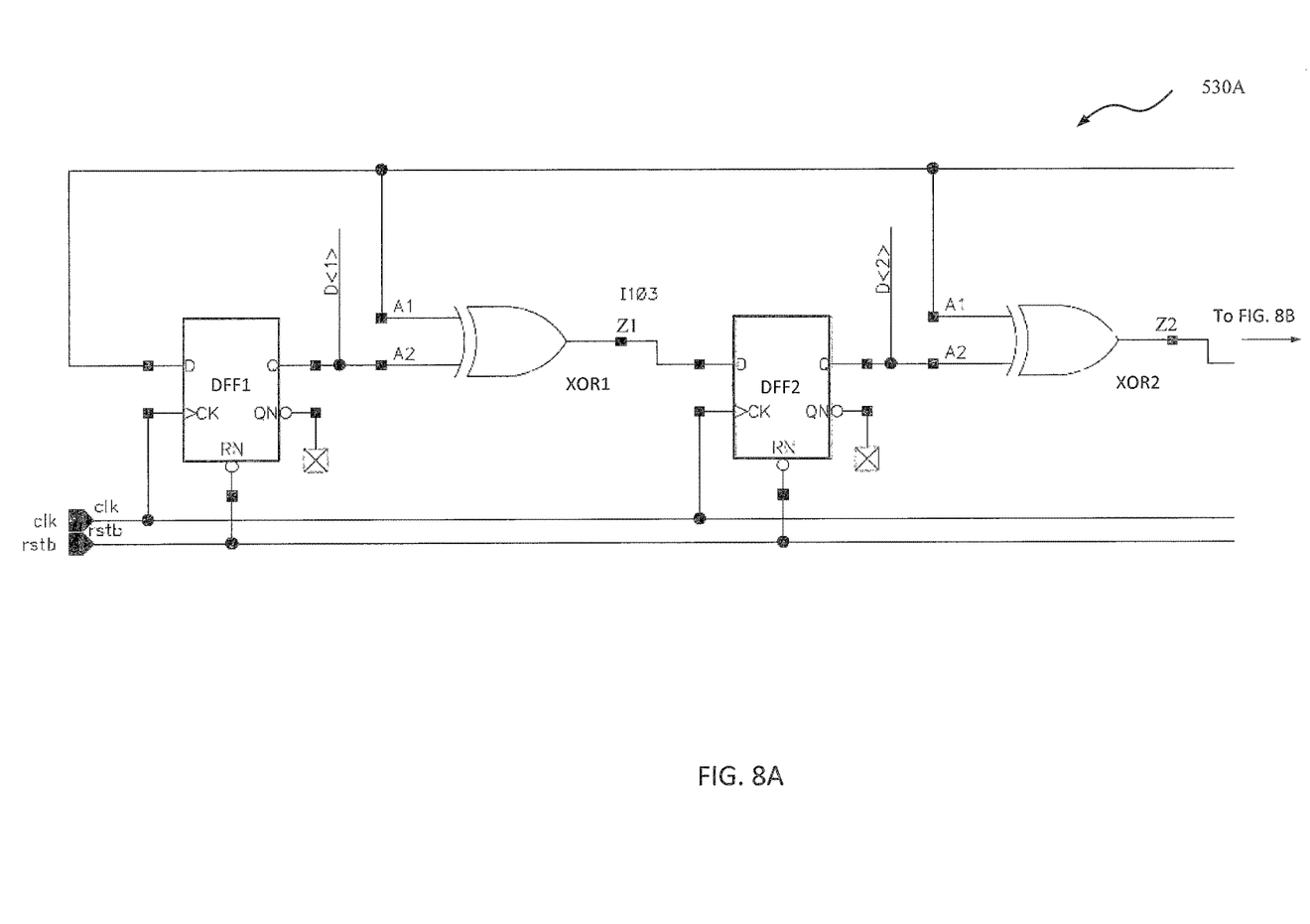
FIG. 8A-8D are respective circuit diagrams for parts of header error corrector according to an embodiment of the invention.

As shown in FIG. 8A, a Q port of the first DFF (DFF1) is connected to a second input port A2 of the first XOR gate XOR1. An output port Z1 of the first XOR gate XOR1 is connected to a D port of the second DFF (DFF2). A Q port of the second DFF (DFF2) is connected to a second input port A2 of the second XOR gate XOR2. The second XOR gate XOR2 has an output port Z2.

Figure 8B:
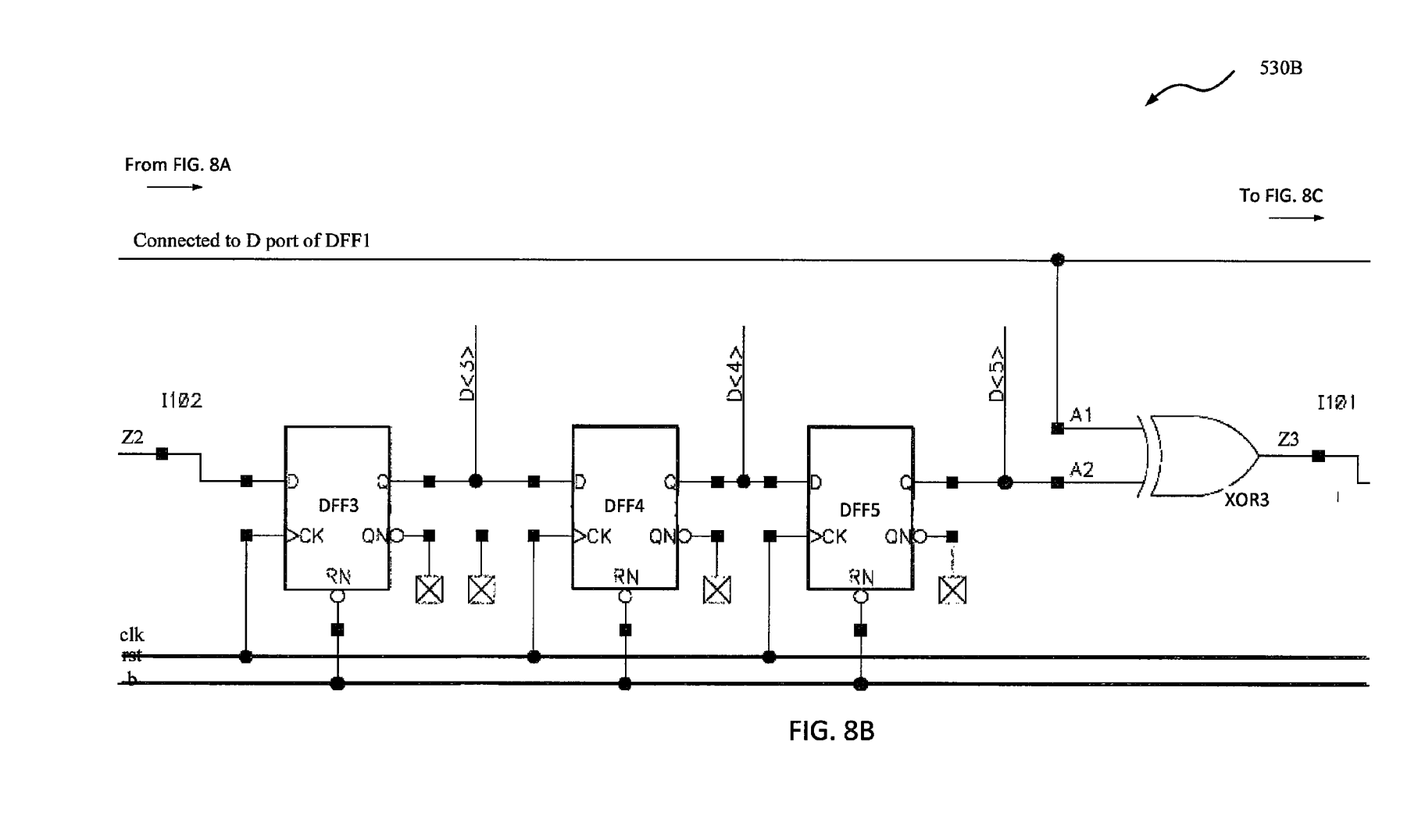

As shown in FIG. 8B, the output port Z2 of the second XOR gate XOR2 is connected to a D port of the third DFF (DFF3).

A Q port of the third DFF (DFF3) is connected to a D port of the fourth DFF (DFF4). A Q port of the fourth DFF (DFF4) is connected to a D port of the fifth DFF (DFF5). A Q port of the fifth DFF (DFF5) is connected to a second input port A2 of the third XOR gate XOR3. The third XOR gate XOR3 has an output port Z3.

Figure 8C:
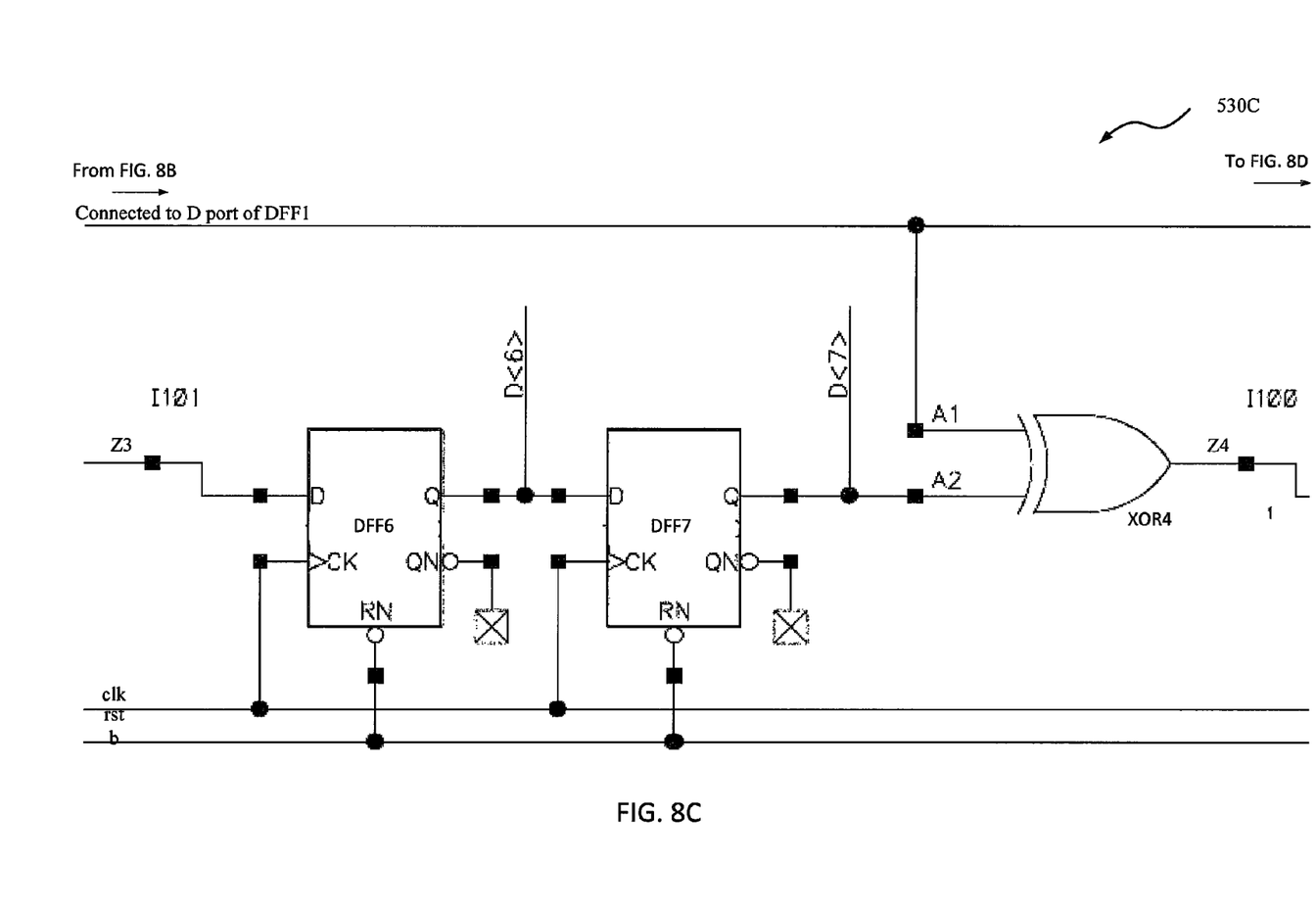

As shown in FIG. 8C, an output port Z3 of the third XOR gate XOR3 is connected to a D port of the sixth DFF (DFF6). A Q port of the sixth DFF (DFF6) is connected to a D port of the seventh DFF (DFF7). A Q port of the seventh DFF (DFF7) is connected to a second input port A2 of the fourth XOR gate XOR4. The fourth XOR gate XOR4 comprises an output port Z4.

Figure 8D:
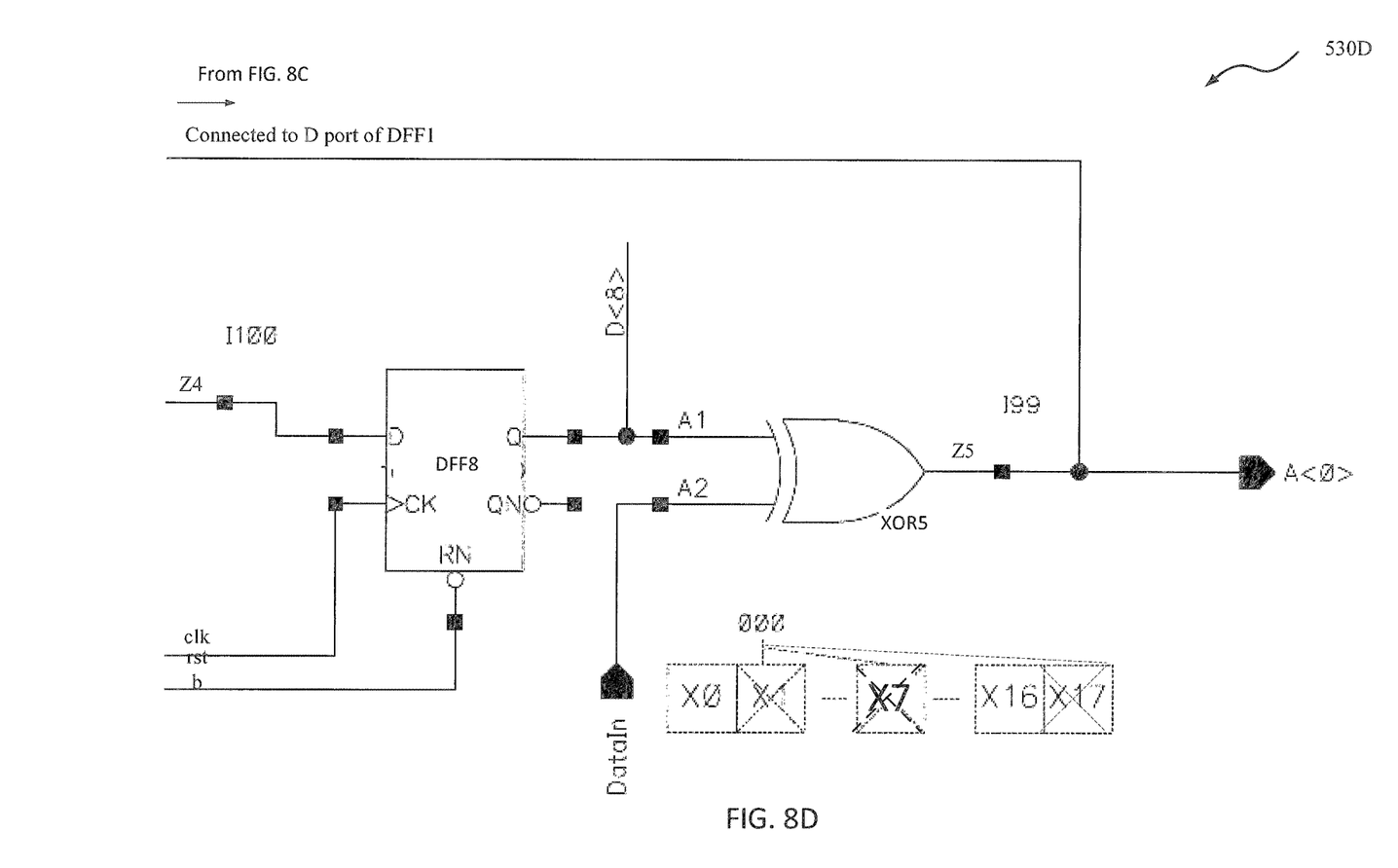

As shown in FIG. 8D, the output port Z4 of the fourth XOR gate XOR4 is connected to a D port of the eighth DFF (DFF8). A Q port of the eighth DFF (DFF8) is connected to a first input port A1 of the fifth XOR gate XOR5. A second input port A2 of the fifth XOR XOR5 is further configured to receive each combination with all other decided decoded bits of the code word. As shown in FIG. 8D, the second input port A2 of the fifth XOR5 receives DataIn. In an embodiment of the invention, DataIn comprises 18 bits. Referring back to FIGS. 3 and 4, three bits, x1, x7, and x17 are determined as error erasable bits, which are marked with crosses in FIG. 8D. Therefore, all enumerated possible combinations of x1, x7 and x17, together with all other decided decoded bits (with no crosses) of a code word are fed into the second input port A2 of the fifth XOR gate XOR5. The XOR performs XOR operation on the signal from the Q port of the eighth DFF (DFF8), and the DataIn, and generates an HEC intermediate value A<0>. Although FIG. 8A-8D only show one HEC 5300, those skilled in the art can understand that the circuit 500 may include a plurality of similar HEC 5300. For example, the circuit 500 may include 8 HECs, each of which simultaneously receives a combination of DataIn, as there may be 8 different combinations. Each of the HECs checks 8 combinations of demodulated code words, and a correct HEC is selected as a successful decoding result. An output of the fifth XOR gate XOR5 is connected to the D port of the first DFF (DFF1), and is further configured to output an HEC decision A<0>.

Figure 9:
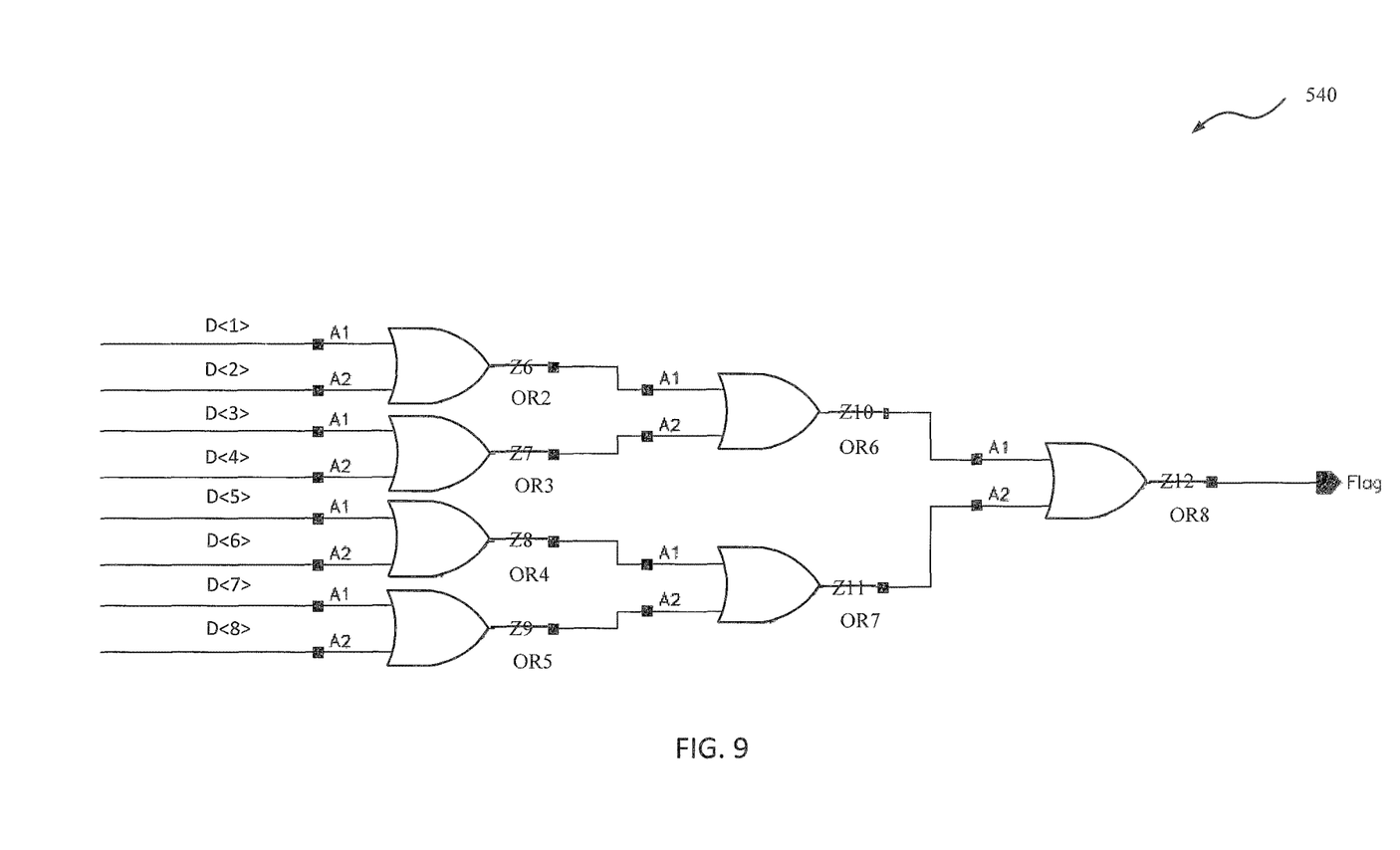
FIG. 9 is a circuit diagram for a decision circuit according to an embodiment of the invention.

FIG. 9 is a circuit diagram of the decision circuit 540 shown in FIG. 5 according to an embodiment of the invention. The decision circuit 540 shown in FIG. 5 further comprises a second OR gate O2, a third OR gate OR3, a fourth OR gate OR4, a fifth OR gate OR5, a sixth OR gate OR6, a seventh OR gate OR7, and an eighth OR gate OR8.

A first and a second input port A1 and A2 of the second OR gate OR2 are respectively configured to receive a first and a second digits D<1> and D<2> of the nth digit of the output signal from the output port Z5 of the fifth XOR gate XOR5 shown in FIG. 8A. A first and a second input port A1 and A2 of the third OR gate OR3 are respectively configured to receive a third and a fourth digits D<3> and D<4> of the nth digit of the output signal shown in FIG. 8B. A first and a second input port A1 and A2 of the fourth OR gate OR4 are respectively configured to receive a fifth and a sixth digits D<5> and D<6> of the nth digit of the output signal respectively shown in FIG. 8B and FIG. 8C. A first and a second input port A1 and A2 of the fifth OR gate OR5 are respectively configured to receive a seventh and an eighth digits D<7> and D<8> of the nth digit of the output signal respectively shown in FIG. 8C and FIG. 8D.

A first and a second input port A1 and A2 of the sixth OR gate OR6 are respectively configured to receive an output signal Z6 of the second OR gate OR2 and an output signal Z7 of the third OR gate OR3. A first and a second input port A1 and A2 of the seventh OR gate OR7 are respectively configured to receive an output signal Z8 of the fourth OR gate OR4 and an output signal Z9 of the fifth OR gate OR5.

A first and a second input port A1 and A2 of the eighth OR gate OR8 are respectively configured to receive an output signal Z10 of the sixth OR gate OR6 and an output signal Z11 of the seventh OR gate OR7. An output port Z12 of the eighth OR gate OR8 is configured to output a signal Flag indicating which header correction check (HEC) result is correct.

Further, the controller 510 may be implemented by a digital comparator in an embodiment of the invention.

The embodiments of the invention may be applicable to Bluetooth system, and any other system that may use 1/3FEC+HEC encoding scheme.

In an embodiment, wherein the adder further comprises a first adding unit, a second adding unit, and a first OR gate, wherein a first input port and a second input port of the first adding unit are respectively configured to receive first and second bits of the adjacent bits, a sum port of the first adding unit is connected to a first input port of the second adding unit; a second input port of the second adding unit is connected to a Cout port of the first adding unit, a Cin port of the second adding unit is connected to a third bit of the adjacent bits, and a Cout port of the second adding unit is connected to a second input port of the first OR gate; a first input port of the first OR gate is connected to the Cout port of the first adding unit, wherein an output port of the first OR gate is configured to output a first value of the demodulated decision information, a Cout port of the first adding unit is connected to a first input port of the first AND gate, and a Cout port of the second adding unit is connected to a second input port of the first AND, and an output port of the first AND gate is configured to output a second value of the demodulated decision information.

In an embodiment, wherein the header correction checker further comprises a first D-type Flip Flop (DFF), a second DFF, a third DFF, a fourth DFF, a fifth DFF, a sixth DFF, a seventh DFF, and an eighth DFF, a first XOR gate, a second XOR gate, a third XOR gate, a fourth XOR gate, and a fifth XOR gate, wherein a clock port of the nth DFF (n equals 1 to 8, and n is an integer) is configured to receive a clock signal, a negative reset port of the nth DFF is configured to receive a negative reset signal, and a first input port of the mth (m equals 1 to 4, and m is an integer) XOR gate is connected to a D port of the first DFF, and a Q port of the nth DFF is further configured to outputs a nth digit of an output signal, wherein a Q port of the first DFF is connected to a second input port of the first XOR gate; an output port of the first XOR gate is connected to a D port of the second DFF; a Q port of the second DFF is connected to a second input port of the second XOR gate; an output port of the second XOR gate is connected to a D port of the third DFF; a Q port of the third DFF is connected to a D port of the fourth DFF; a Q port of the fourth DFF is connected to a D port of the fifth DFF; a Q port of the fifth DFF is connected to a second input port of the third XOR gate; an output port of the third XOR gate is connected to a D port of the sixth DFF; a Q port of the sixth DFF is connected to a D port of the seventh DFF; a Q port of the seventh DFF is connected to a second input port of the fourth XOR gate; an output port of the fourth XOR gate is connected to a D port of the eighth DFF; a Q port of the eighth DFF is connected to a first input port of the fifth XOR gate, a second input port of the fifth XOR is further configured to receive each combination with all other decided decoded bits of the code word, and an output of the fifth XOR gate is connected to the D port of the first DFF, and is further configured to output an HEC decision.

In an embodiment, wherein the decision circuit further comprises a second OR gate, a third OR gate, a fourth OR gate, a fifth OR gate, a sixth OR gate, a seventh OR gate, and an eighth OR gate, wherein a first and a second input port of the second OR gate are respectively configured to receive a first and a second digits of the nth digit of the output signal; a first and a second input port of the third OR gate are respectively configured to receive a third and a fourth digits of the nth digit of the output signal; a first and a second input port of the fourth OR gate are respectively configured to receive a fifth and a sixth digits of the nth digit of the output signal; a first and a second input port of the fifth OR gate are respectively configured to receive a seventh and an eighth digits of the nth digit of the output signal; a first and a second input port of the sixth OR gate are respectively configured to receive an output signal of the second OR gate and an output signal of the third OR gate; a first and a second input port of the seventh OR gate are respectively configured to receive an output signal of the fourth OR gate and an output signal of the fifth OR gate; a first and a second input port of the eighth OR gate are respectively configured to receive an output signal of the sixth OR gate and an output signal of the seventh OR gate; and an output port of the eighth OR gate is configured to output a signal indicating which header correction check (HEC) result is correct.

In an embodiment, wherein the demodulated decision information comprises demodulated hard decision information.

In an embodiment, wherein the demodulated decision information comprises demodulated soft decision information.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, or other similar device(s); or c) a combination of the forms mentioned in a) and b).

Although the present invention has been described with reference to specific exemplary embodiments, the present invention is not limited to the embodiments described herein, and it can be implemented in form of modifications or alterations without deviating from the spirit and scope of the appended claims. Accordingly, the description and the drawings are to be regarded in an illustrative rather than a restrictive sense.

From the foregoing, it will be appreciated that specific embodiments of the technology have been described herein for purposes of illustration, however various modifications can be made without deviating from the spirit and scope of the present invention. Accordingly, the present invention is not restricted except in the spirit of the appended claims.

Other variations to the disclosed embodiments can be understood and effected by those skilled in the art in practicing the claimed invention, from a study of the drawings, the disclosure, and the appended claims. In the claims the word "comprising" does not exclude other elements or steps, and the indefinite article "a" or "an" does not exclude a plurality. Even if particular features are recited in different dependent claims, the present invention also relates to the embodiments including all these features. Any reference signs in the claims should not be construed as limiting the scope.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

What is claimed is:

1. A circuit of error decision, comprising:
  a receiver configured to receive a code word;
  for each of a plurality of demodulated decision information for a code word,
  an adder connected to the receiver and configured to obtain the demodulated decision information by adding a predetermined number of adjacent bits within the code word, wherein the predetermined number equals three; wherein the plurality of demodulated decision includes a decision for cyclic redundancy correction bits—
  a controller configured to identify, a decoded bit for the demodulated decision as an erasable error bit if the demodulated decision information is larger than a first threshold and smaller than a second threshold;
  for all the identified erasable error bits—
  a calculator connected to the controller and configured to enumerate all possible combinations of the identified erasable error bits;
  for each combination of all enumerated possible combinations—
  the calculator is further configured to feed each combination with all other decided decoded bits of the code word into a header correction checker, wherein all the other decided decoded bits are not identified as erasable error bits, and
  the header correction checker connected to the calculator and is further configured to perform header correction checking for each combination;
  a decision circuit connected to the header correction checker and configured to output a combination with a correct header correction check (HEC) result as an output sequence with reduced frame error rate.

2. The circuit of claim 1, wherein before the controller identifies the decoded bit as the erasable error, the controller is further configured to:
  decide whether a demodulated decision information is larger than a first threshold and smaller than a second threshold;
  identify a decoded bit for the demodulated decision information as 0 if the demodulated decision result equals the first threshold; and
  identify a decoded bit for the demodulated decision information as 1 if the demodulated decision result equals the second threshold.

3. The circuit of claim 1, wherein the calculator is further configured to stop feeding each combination with all the other decided decoded bits of the code word into a header correction checker once the combination with the correct header correction check result is obtained.

4. The circuit of claim 1, wherein the adder further comprises a first adding unit, a second adding unit, and a first OR gate, wherein a first input port and a second input port of the first adding unit are respectively configured to receive first and second bits of the adjacent bits, a sum port of the first adding unit is connected to a first input port of the second adding unit; a second input port of the second adding unit is connected to a Cout port of the first and a Cout port of the second adding unit is connected to a second input port of the first OR gate; a first input port of the first OR gate is connected to the Cout port of the first adding unit, wherein an output port of the first OR gate is configured to output a first value of the demodulated decision information, a Cout port of the first adding unit is connected to a first input port of the first AND gate, and a Cout port of the second adding unit is connected to a second input port of the first AND, and an output port of the first AND gate is configured to output a second value of the demodulated decision information.

5. The circuit of claim 1, wherein the header correction checker further comprises a first D-type Flip Flop (DFF), a second DFF, a third DFF, a fourth DFF, a fifth DFF, a sixth DFF, a seventh DFF, and an eighth DFF, a first XOR gate, a second XOR gate, a third XOR gate, a fourth XOR gate, and a fifth XOR gate, wherein a clock port of the nth DFF (n equals 1 to 8, and n is an integer) is configured to receive a clock signal, a negative reset port of the nth DFF is configured to receive a negative reset signal, and a first input port of the mth (m equals 1 to 4, and m is an integer) XOR gate is connected to a D port of the first DFF, and a Q port of the nth DFF is further configured to outputs a nth digit of an output signal, wherein a Q port of the first DFF is connected to a second input port of the first XOR gate;

an output port of the first XOR gate is connected to a D port of the second DFF;

a Q port of the second DFF is connected to a second input port of the second XOR gate;

an output port of the second XOR gate is connected to a D port of the third DFF;

a Q port of the third DFF is connected to a D port of the fourth DFF;

a Q port of the fourth DFF is connected to a D port of the fifth DFF;

a Q port of the fifth DFF is connected to a second input port of the third XOR gate;

an output port of the third XOR gate is connected to a D port of the sixth DFF;

a Q port of the sixth DFF is connected to a D port of the seventh DFF;

a Q port of the seventh DFF is connected to a second input port of the fourth XOR gate;

an output port of the fourth XOR gate is connected to a D port of the eighth DFF;

a Q port of the eighth DFF is connected to a first input port of the fifth XOR gate, a second input port of the fifth XOR is further configured to receive each combination with all other decided decoded bits of the code word, and an output of the fifth XOR gate is connected to the D port of the first DFF, and is further configured to output an HEC decision.

6. The circuit of claim 5, wherein the decision circuit further comprises a second OR gate, a third OR gate, a fourth OR gate, a fifth OR gate, a sixth OR gate, a seventh OR gate, and an eighth OR gate, wherein a first and a second input port of the second OR gate are respectively configured to receive a first and a second digits of the nth digit of the output signal;

a first and a second input port of the third OR gate are respectively configured to receive a third and a fourth digits of the nth digit of the output signal;

a first and a second input port of the fourth OR gate are respectively configured to receive a fifth and a sixth digits of the nth digit of the output signal;

a first and a second input port of the fifth OR gate are respectively configured to receive a seventh and an eighth digits of the nth digit of the output signal;

a first and a second input port of the sixth OR gate are respectively configured to receive an output signal of the second OR gate and an output signal of the third OR gate;

a first and a second input port of the seventh OR gate are respectively configured to receive an output signal of the fourth OR gate and an output signal of the fifth OR gate;

a first and a second input port of the eighth OR gate are respectively configured to receive an output signal of the sixth OR gate and an output signal of the seventh OR gate; and an output port of the eighth OR gate is configured to output a signal indicating which header correction check (HEC) result is correct.

7. The circuit of claim 1, wherein the demodulated decision information comprises demodulated hard decision information.

8. The circuit of claim 1, wherein the demodulated decision information comprises demodulated soft decision information.

* * * * *